United States Patent Office 2,992,930
Patented July 18, 1961

2,992,930
LOW DENSITY REFRACTORY OXIDE
William H. Wheeler and Joseph P. Olivito, Baltimore County, Md., assignors to The Martin Company, Middle River, Md., a corporation of Maryland
No Drawing. Filed June 23, 1959, Ser. No. 822,203
6 Claims. (Cl. 106—40)

This invention relates to refractory products and more particularly to refractory oxide compositions exhibiting a high degree of porosity, and a method for making same.

Porous refractory oxide articles have been investigated previously for application in light-weight structures subject to very high temperatures. For example, a layer of refractory oxide may be incorporated into the leading edge of a missile wing so as to protect the underlying structure from excessive heating caused by air friction during supersonic atmospheric traverse. The oxide, being capable of withstanding temperatures above the failure point of the underlying structure, is able to effectively insulate lower melting materials during brief exposures to high temperatures such as are encountered in high speed flight.

Refractory oxide articles having low densities have heretofore been produced by foaming a slurry containing the oxide, phosphoric acid, a blowing agent, a foam stabilizer and sufficient water to make up a workable mixture. Approximately two days of air drying must be permitted for the foam to obtain a stable set, so that it may be safely handled without slumping. A subsequent forced drying period of about 24 hours is then required to completely eliminate excess moisture. It has been found, however, that unless special care is taken during the drying cycle, the internal foam structure tends to collapse when heat is applied. Foam densities obtainable heretofore have been limited to approximately 1.0, but the low densities can only be attained with the exercise of great caution during and after the foaming operation, because of the pronounced tendency of prior art foams to slump.

It is a purpose, therefore, of this invention to provide a low density refractory metal oxide composition which will attain a stable set after drying at room temperature for about two hours or less. The nascent foam exhibits a superior resistance to slumping, with the result that foam densities of about 0.8 may be obtained without difficulty. The foam quickly acquires a rigidity which permits it to be shaped or molded as desired without danger of slumping. Complete drying is readily effected in about 9 hours, and complete phosphate bonding, in about 10.5–11 hours.

In accordance with the present invention, a slurry is provided for the production of improved foamed oxide articles principally containing zirconium oxide, $ZrO_2$, or aluminum oxide $Al_2O_3$. The slurry consists of the powdered oxide, a foam stabilizer, a room temperature setting agent, phosphoric acid, water and a material which will react with the acid to produce a gas.

The stabilizing agent in accordance with the invention is wollastonite or tabular spar, $CaSiO_3$, which has been found to be superior to prior art stabilizers. In combination with the wollastonite there is also employed a setting agent consisting of the reaction product of a colloidal silica sol and an alkali metal silicate which cooperate to form a strong bond at room temperature soon after the foaming operation has been completed. The aforesaid stabilizing and setting agents make it possible to produce in a short time a stable foam of very high porosity free from any tendency to slump. Within about 2 hours or less after foaming, room temperature mechanical stability is such that the foam may be molded to shape.

The room temperature setting agent consists of a binder of an aqueous silica sol and an activator of solid alkali metal silicate having a metal oxide to silica mole ratio within the range of 1:1 to 1:4.2. The silica sol binder and the alkali metal silicate activator react to form a rigid cement.

The percentage of alkali metal silicate may be varied as explained below and may range from about 1.7% to about 7.6% of the combined weight of the refractory oxide and wollastonite.

Preferably the silicate activator is substantially anhydrous but hydrate silicates have also been used to produce satisfactory cements. Particular colloidal silica sols and alkali metal silicate activators and exemplary combinations of same for forming room temperature setting agents are described in U.S. Patent 2,914,413 to Mercer wherein a preferred $Na_2O:SiO_2$ mole ratio range is shown as 1:1.4 to 1:3.3 in column 5, line 35 of the specification and also in claim 10 thereof.

As explained in the Mercer patent the activator may be a sodium, potassium or lithium salt, but superior results are obtained when the activator is derived from sodium silicate. The working life of these cements is dependent upon the compositions of the binder and the activator. For example, the combination of a silica sol containing by weight 30.4% $SiO_2$ and 0.14% $Na_2O$ at a pH of about 8.45 with a sodium silicate activator wherein the mole ratio of $Na_2O:SiO_2$ is about 1:2.9 will have a working life of about one hour after which time it becomes rigid and may be handled safely. The cement so obtained firmly sets in about three hours. This particular combination of silica sol and alkali metal silicate is preferred for the purposes of this invention. However, other combinations of silica sols and alkali metal silicates as disclosed by Mercer may be used depending upon what working life is desired in the setting agent or cement.

The composition of the sidium silicate activator may be readily varied by proportioning amounts of solid $Na_2O \cdot 3.3SiO_2$ and solid $Na_2O \cdot 2SiO_2$. For purposes of clarity as referred to hereinafter, "alkali metal silicate" is to be understood as meaning the preferred sodium silicate; and "silic acid sol" as meaning the preferred silica sol.

The aqueous silica sol and alkali metal silicate combine to form a green bond in the foam, so that it may be shaped or otherwise handled soon after foaming without collapsing. A second type of bond is subsequently established in the foam by the reaction of phosphoric acid and the oxide to form a phosphate. A third and stronger chemical bond may be obtained by sintering the foamed oxide.

Phosphoric acid is used in the present composition for two purposes. In combination with either a reactive metal or a suitable inorganic material it produces a gas which foams or blows the slurry to desired density. Excess phosphoric acid which is not reacted during the foaming operation is subsequently caused to react with the oxide constituent by applying heat, whereby a strong phosphate-bonded foamed mass is obtained.

In order to obtain a satisfactory phosphate bond, the ratio of phosphoric acid to oxide must be maintained within certain limits. When aluminum oxide is the principal constituent of the refractory article, from about 6 to 12 cc. of 85% phosphoric acid is combined with each 100 grams of aluminum oxide. A larger amount of acid is required to produce phosphate-bonded zirconia, specifically, from about 10 to 15 cc. of 85% phosphoric acid per 100 grams of zirconium oxide.

A metal such as aluminum or an inorganic material like dolomite (calcium magnesium carbonate, $CaCO_3 \cdot MgCO_3$)

is reacted with the phosphoric acid to yield a gas. In the case of aluminum, hydrogen is formed, whereas dolomite is decomposed with the evolution of water and carbon dioxide, leaving a residue of the combined oxides of calcium and magnesium. It is obvious, of course, that materials other than aluminum and dolomite may be reacted with phosphoric acid to produce a gas. These materials include metals which displace hydrogen from phosphoric acid and compounds yielding a gas when acted upon by hydrogen ion. The particular metal or inorganic material used will depend upon its physical form and chemical reactivity, which determine the rate at which gas is evolved.

The present foamed articles may be prepared by thoroughly blending particles of wollastonite, alkali metal silicate and aluminum or dolomite with the powdered metal oxide. To the resulting powder mixture is added an aqueous suspension of colloidal silica in water. Phosphoric acid is then stirred into the mixture. The slurry so obtained is poured into molds and allowed to rise for about 5 minutes or more. About two hours are allowed for setting that is, for the setting agent to become rigid enough so that the foam may be handled without slumping.

A generalized oxide slurry contains the following constituents in the approximate proportions indicated:

Refractory oxide____ 100 gm.
Wollastonite_____ 6–15 gm.
Orthophosphoric acid 8–22 gm.
Alkali metal silicate_ 2–8 gm.
Blowing agent_____ 0.1–0.7 gm.
Aqueous silica sol___ Sufficient to bond the refractory oxide and wollastonite into a coherent mass.

A generalized aluminum oxide slurry contains the following amounts of the various components per 100 gm. of aluminum oxide: 6–10 gm. powdered wollastonite, 0.15–0.5 gm. aluminum powder, 2.5–5.0 gm. alkali metal silicate, 6–12 cc. of 85% phosphoric acid, and sufficient aqueous silica sol to bond the refractory oxide and wollastonite into a coherent mass. Instead of aluminum powder, about 0.1 to 0.2 gm. of dolomite may be used.

Slurries principally containing zirconium oxide are prepared in essentially the same manner with the exception that higher concentrations of phosphoric acid are required, as explained previously.

Foams obtained from both the $Al_2O_3$ and $ZrO_2$ slurries become highly resistant to slumping or internal collapse after standing in air at room temperature for about two hours. During this time the aqueous silica sol and alkali metal silicate cure to form a strongly bonded porous structure. The alkali metal silicate constitutes between 2% to 8% by weight of the refractory oxide present in the slurry. The aqueous silica sol, a liquid which contains the equivalent of 30% $SiO_2$ in the form of extensively hydrated highly polymeric aggregates, is incorporated into the slurry in the ratio of 10 to 20 cc. of aqueous silica sol suspension per 100 grams of refractory oxide.

When the foam has become sufficiently rigid at room temperature it may be shaped to the desired contour without slumping, but preferably it is first dried in air at a temperature below the boiling point of water to drive off the major part of unbonded water. Drying may be performed at 200° F. for a period of about 12 hours, or according to an accelerated drying schedule, for example:

| Drying temperature, ° F.: | Time (hours) |
|---|---|
| 150–200 | 2 |
| 250 | 1 |
| 350 | 1 |
| 450 | 1 |
| 550 | 1 |

This drying schedule may be varied as desired, depending upon the moisture content of the foam.

When drying has been substantially completed, the foam is heated to a temperature at which the metal oxide, $Al_2O_3$ or $ZrO_2$, and the phosphoric acid react to form a phosphate bond. Choice of heating temperature and heating time will depend largely upon what equipment is available. Preferably, aluminum oxide foam is bonded at 700° F. for about two hours; zirconium oxide foam at about 900° F. for two hours. The use of higher temperatures, for example, 1500° F., considerably shorten the required heating time.

In order to provide a better understanding of the present invention, reference is made to the following examples.

*Example I*

A powder mixture was prepared consisting essentially of

| | Gm. |
|---|---|
| Powdered wollastonite | 10 |
| Alkali metal silicate | 3 |
| Aluminum powder | 0.5 |
| 325 mesh aluminum oxide | 100 |

An aqueous silica sol in an amount sufficient to bond the oxide and the wollastonite into a coherent mass was mixed with the powder mixture. Eight cc. of 85% phosphoric acid was then poured in, and the mixture beaten for about one minute in insure complete and uniform reaction of the various materials. The resulting slurry was poured into a mold of suitable shape and allowed to expand to full height. After standing ½ hour in air at room temperature, the mold and foam contained therein were placed in a dryer at 200° F. for 12 hours. This drying treatment was followed by heating in an oven at 700° F. for two hours to obtain a phosphate-bonded alumina foam having a density of 1.1 gm./cc.

*Example II*

A powder mixture was prepared consisting essentially of

| | Gm. |
|---|---|
| 325 mesh aluminum oxide | 100 |
| Wollastonite | 8 |
| Alkali metal silicate | 5 |
| Aluminum powder | 0.1 |

This mixture was prepared into a slurry by admixture with an aqueous silica sol. After the slurry had been thoroughly blended, 6 cc. of 85% phosphoric acid were stirred in, and the procedure according to Example I was followed. The resulting phosphate-bonded aluminum oxide foam had a density of 0.8 gm./cc.

*Example III*

A powder mixture having the following composition was prepared:

| | Gm. |
|---|---|
| Zirconium oxide | 100 |
| Wollastonite | 7 |
| Alkali metal silicate | 5 |
| Dolomite | 0.1 |

To this mixture was added an aqueous silica sol to form a slurry. The slurry was then blown by adding 10 cc. of 85% phosphoric acid, and allowed to stand in air at room temperature for about 2 hours. Subsequent drying at 200° F. for 8 hours and curing at 900° F. for 7 hours was performed. The phosphate-bonded foam so obtained had a density of 1.6 gm./cc.

We claim:

1. A method for making porous refractory oxide articles comprising the steps of preparing a mixture consisting by weight of 100 parts of a particulate refractory oxide selected from the group consisting of aluminum oxide and zirconium oxide, 6 to 15 parts of particulate calcium silicate as a foam stabilizer, 0.1 to 0.7 part of a particulate blowing agent, 8 to 22 parts of orthophosphoric acid, and aqueous silica sol in an amount sufficient to bond said refractory oxide and the calcium silicate into a coherent mass, 2 to 8 parts of a solid alkali metal silicate, said alkali metal silicate having an alkali metal oxide to silica mole ratio in the range from 1:1 to 1:4.2, and sufficient water to make a workable slurry, drying the foamed product so obtained to remove excess water, and heating the dried foamed product so as to form a phosphate-bonded mass.

2. The method of claim 1 wherein said alkali metal silicate is derived from at least one sodium silicate selected from the group consisting of $Na_2O \cdot 2SiO_2$ and $Na_2O \cdot 3.3SiO_2$.

3. The method of claim 2 wherein said alkali metal silicate has a $Na_2O$ to $SiO_2$ mole ratio 1:1.4 to 1:3.3 and said silica sol consists by weight of about 30.4 percent $SiO_2$, 0.14 percent $Na_2O$.

4. A composition for the manufacture of foamed refractory oxides consisting by weight of 100 parts of a particulate refractory oxide selected from the group consisting of aluminum oxide and zirconium oxide, 6 to 15 parts of particulate calcium silicate as a foam stabilizer, 0.1 to 0.7 part of a particulate blowing agent, 8 to 22 parts of orthophosphoric acid, an aqueous silica sol in an amount sufficient to bond said refractory oxide and the calcium silicate into a coherent mass, 2 to 8 parts of a solid alkali metal silicate, said alkali metal silicate having an alkali metal oxide to silica mole ratio in the range from 1:1 to 1:4.2 and sufficient water to make a workable slurry.

5. The composition of claim 4 wherein said alkali metal silicate is derived from at least one sodium silicate selected from the group consisting of $Na_2O \cdot 2SiO_2$ and $Na_2O - 3.3SiO_2$.

6. The composition of claim 5 wherein said alkali metal silicate has a $Na_2O$ to $SiO_2$ mole ratio of between 1:1.4 and 1:3.3 and said silica sol consists by weight of about 30.4 percent $SiO_2$, 0.14 percent $Na_2O$.

References Cited in the file of this patent

UNITED STATES PATENTS

| | | |
|---|---|---|
| 2,395,291 | Patterson | Feb. 19, 1946 |
| 2,852,401 | Hansen et al. | Sept. 16, 1958 |
| 2,881,081 | Henricks | Apr. 7, 1959 |
| 2,883,723 | Moore et al. | Apr. 28, 1959 |
| 2,895,838 | Ilenda | July 21, 1959 |
| 2,914,413 | Mercer | Nov. 24, 1959 |

FOREIGN PATENTS

| | | |
|---|---|---|
| 111,957 | Australia | Nov. 18, 1940 |